United States Patent
Huang et al.

(10) Patent No.: US 7,229,520 B2
(45) Date of Patent: Jun. 12, 2007

(54) METHOD FOR MANUFACTURING SPANDREL GLASS FILM WITH METAL FLAKES

(75) Inventors: Haibin Huang, Tampa, FL (US); Verne Joseph R. Flores, Brandon, FL (US)

(73) Assignee: Film Technologies International, Inc., St. Petersburg, FL (US)

( * ) Notice: Subject to any disclaimer, the term of this patent is extended or adjusted under 35 U.S.C. 154(b) by 389 days.

(21) Appl. No.: 10/788,126

(22) Filed: Feb. 26, 2004

(65) Prior Publication Data

US 2005/0189060 A1 Sep. 1, 2005

(51) Int. Cl.
*B32B 37/12* (2006.01)

(52) U.S. Cl. .......................... 156/324; 156/99; 427/165

(58) Field of Classification Search .................... None
See application file for complete search history.

(56) References Cited

U.S. PATENT DOCUMENTS

| | | | |
|---|---|---|---|
| 3,532,528 A * | 10/1970 | Bradshaw et al. .......... 106/403 |
| 3,537,944 A | 11/1970 | Grubb et al. | |
| 3,869,198 A | 3/1975 | Ballentine | |
| 4,236,934 A | 12/1980 | Bell | |
| 4,678,690 A * | 7/1987 | Palmer et al. ................. 428/31 |
| 4,799,745 A | 1/1989 | Meyer et al. | |
| 4,963,206 A | 10/1990 | Shacklette | |
| 4,971,841 A | 11/1990 | Panush et al. | |
| 4,997,687 A | 3/1991 | Carter | |
| 4,999,076 A * | 3/1991 | Incremona et al. ......... 156/241 |
| 5,030,503 A | 7/1991 | Carter et al. | |
| 5,034,269 A * | 7/1991 | Wheeler ................... 428/317.3 |
| 5,037,475 A | 8/1991 | Chida et al. | |
| 5,071,206 A | 12/1991 | Hood et al. | |
| 5,156,894 A | 10/1992 | Hood et al. | |
| 5,234,711 A | 8/1993 | Kamen et al. | |
| 5,320,893 A | 6/1994 | Floyd | |
| 5,332,888 A | 7/1994 | Tausch et al. | |
| 5,405,675 A * | 4/1995 | Sawka et al. ............. 428/195.1 |
| 5,468,532 A | 11/1995 | Ho et al. | |
| 5,585,427 A | 12/1996 | Schimmel et al. | |
| 5,750,265 A | 5/1998 | Goodman | |
| 5,897,957 A | 4/1999 | Goodman | |
| 6,030,671 A | 2/2000 | Yang et al. | |
| 6,218,018 B1 | 4/2001 | McKown et al. | |
| 6,294,233 B1 | 9/2001 | Barth et al. | |
| 6,333,084 B1 | 12/2001 | Woodard et al. | |
| 6,376,559 B1 * | 4/2002 | Komoto et al. ................ 516/34 |
| 6,383,644 B2 * | 5/2002 | Fuchs ....................... 428/424.8 |
| 6,391,400 B1 | 5/2002 | Russell et al. | |
| 6,398,861 B1 * | 6/2002 | Knox .......................... 106/404 |
| 6,546,692 B1 | 4/2003 | Duncan et al. | |
| 6,558,800 B1 | 5/2003 | Stachowiak | |

(Continued)

*Primary Examiner*—Jessica Ward
(74) *Attorney, Agent, or Firm*—Christopher Paradies; Fowler White Boggs Banker P.A.

(57) ABSTRACT

A film laminating adhesive is formed by admixing a polyester resin and encapsulated metallic flakes. The metallic flakes are encapsulated with a silane in a hydrolyzed condition modified with a surfactant or dispersion agent. A mounting adhesive is applied to an outside surface of a first clear PET film. A silicone liner is adhered to the outside surface. A second PET film is bonded to another side of the first clear film with the film laminating adhesive containing encapsulated metallic flakes to form the spandrel glass film composite adapted for bonding to a glass surface after removal of the silicone liner.

26 Claims, 1 Drawing Sheet

U.S. PATENT DOCUMENTS 6,632,491 B1    10/2003  Thomsen et al.
6,783,584 B2 *   8/2004  Takahashi ................... 106/403
6,960,247 B2 * 11/2005  Endo et al. .............. 106/14.41
7,078,076 B2 *   7/2006  Maze et al. .............. 427/388.1
2006/0042508 A1 * 3/2006  Henglein et al. ........... 106/415

* cited by examiner

METHOD FOR MANUFACTURING SPANDREL GLASS FILM WITH METAL FLAKES

BACKGROUND OF THE INVENTION

The present invention relates to spandrel glass window film containing metallic flakes. More particularly, it refers to the manufacture of multilayered thin film at least one layer laminated together to an adjacent layer by a laminating adhesive containing dispersed encapsulated metal flakes.

In the window film market problems have arisen in attempting to coat a roll of defect free film using rod, slot die, reverse roll or reverse gravure coating technology.

For long term stability in water based coatings it is known to provide silica encapsulatd aluminum flakes or gold bronze flakes. Encapsulation of the metallic flake has been attempted as shown in U.S. Pat. No. 5,037,475. Encapsulation enables metallic pigments to be uniformly dispersed in a resin system, but that alone does not create defect free film for use as a safety film to provide impact resistance to glass.

Metallic pigments have been used in coating for a long time. To overcome the compatibility problem, many dispersion agents are used to make "leafing" and "non-leafing" flakes. If the metallic flakes are covered with a hydrophobic layer of stearic acid, it causes a significant influence on the wetting properties and will drive the pigments, especially in waterborne systems, towards the coating's surface; i.e., leafing" effect. This "surface-oriented" alignment gives excellent brilliance and chroma, but the pigments are not fully embedded into the coating's film. Consequently, they have poor rub-resistance and are very sensitive to corrosion. The use of surfactants or polar organic solvents provides better wetting, hence pigments turn out to be "non-leafing".

The metallic pigments have been widely used in car paint, consumer products, and construction coating. Based on all these properties, it would be desirable to apply the metallic pigments into window films. The brilliant sparkle effect is a result of large metallic flake orientation. These large particles, unfortunately, cause many coating difficulties. Using traditional coating methods such as rod, slot die, reverse roll and reverse gravure causes coating streaks and pin-holes because of the metallic flake agglomeration. Using dispersion agents can ameliorate the agglomeration but cannot eliminate such agglomeration. When settling occurs, the pigments can form a solid flocculated mass that is often difficult to re-suspend. This small portion of agglomeration can cause significant coating streaks with all the above coating methods. Smaller particles cause less coating streaks but give less desirable appearance. It does not have the brilliant sparkle effect but appears like a dull paint.

A process is needed that will produce a defect free multi-layered film that will provide a safety protective coating to glass with desirable color brilliance.

SUMMARY OF THE INVENTION

The process of this invention employs encapsulated metallic flake in a safety film containing multi-layers of thin polyethyleneterephthalate (PET) films. The metallic flakes are encapsulated with a silica layer using silane in a hydrolyzed condition. The silica coated flakes are then modified with surfactants or dispersion agents.

The coated metallic flakes are admixed in a polyester resin adhesive with methyl ethyl ketone and toluene. Additionally, a crosslinking agent is added to form a laminating adhesive to bond the film layers together.

A first clear PET film is coated on one side with a mounting adhesive such as a pressure sensitive adhesive and protected with a silicone liner. A second PET film colored or clear is bonded on another side to the first clear PET film with the laminating adhesive prepared as set forth above to form a spandrel glass film. This film is then adhesively bonded to a glass surface after removal of the silicone liner to form a safety film on the glass.

BRIEF DESCRIPTION OF THE DRAWINGS

The invention is best understood by those having ordinary skill in the art by reference to the following detailed description when considered in conjunction with the accompanying drawings in which.

DETAILED DESCRIPTION OF THE BEST MODE

Figure 1:
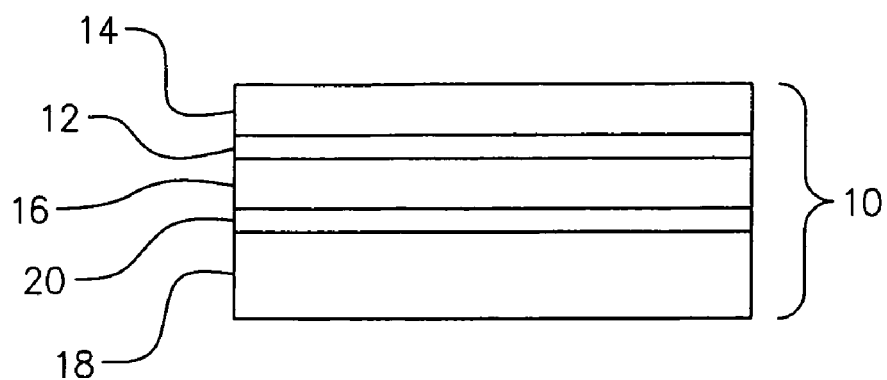
FIG. 1 is a cross sectional view of a safety film manufactured from the process of this invention.

Throughout the following detailed description, the same reference numerals refer to the same elements in all figures.

Critical to the manufacture of a defect free metallic colored safety film is the creation of the laminating adhesive. The coated metallic flakes are formed by mixing metallic flakes with a silane in a hydrolyzed condition to form a silica layer over the metallic flakes. The silica coated flakes are modified with surfactants or dispersion agents to make "leafing" or "non-leafing" products. A cured coating is formed over the flakes which cannot be washed off with solvents. These cured coated flakes do not form agglomerates even if stored for weeks or months.

In order to make the laminating adhesive employed in the process of this invention, the coated metallic flakes are admixed in a polyester resin adhesive with compatible solvents; namely, methyl ethyl ketone and toluene. Additionally, a crosslinking agent such as isocyanide is added to "lock" the coated flakes into the resin system. The laminating adhesive can be any polyester based laminating adhesives on the market, such as products manufactured by Bostik Findley, Ashland Chemical and Rohm and Hass Company. Other laminating adhesives can be used such as polyurethane, vinyl based coating, EVA dispersion or emulsion and other heat seal/hot melt adhesives. Metallic flakes have to be physically encapsulated either with silica and surfactants or other means as disclosed in U.S. Pat. Nos. 5,585,427; 5,234,711 and 5,037,475, incorporated herein by reference. The average particle size range of the metallic flakes can be from 10 microns to 30 microns. The preferred average particle size range is from 14 microns to 28 microns and the most preferred average particle size range is from 23 microns to 27 microns. If the particle size is too small, the resulting film loses the brilliant sparkle appearance. However, if it is too big, it still causes coating streaks because of the narrow coating gap with current coating methods. Methyl ethyl ketone and toluene are the most preferred solvents. Other solvents such as acetone, ethyl acetate, propyl acetate, butyl acetate, ethyl alcohol, butyl alcohol, Isopropyl alcohol, cyclohexanone, ethylene glycol, xylene, etc. also can be used. The weight ratio of the two solvents methylethyl ketone: toluene, can vary from 10:90 to 90:10. The preferred ratio is from 30:70 to 70:30 based on a weight ratio of methyl ethyl ketone to toluene. The most preferred ratio is 50:50 (methyl ethyl ketone to toluene). The pigment to binder weight ratio (metallic pigment to laminating adhesive) can be from 1:2 to 1:50. The preferred ratio is from 1:10 to 1:30. The most preferred ratio is from 1:16 to 1:20.

The film composite can be constructed by laminating a layer or several layers of clear or colored PET films together. At least one layer of PET film is laminated to adjacent layers with an encapsulated metallic pigment dispersed in the laminating adhesive. It is preferred for the laminating adhesive to be polyester based. However, other adhesives can achieve the same function. A pressure sensitive adhesive or mounting adhesive is applied to one side of the film composite which allows the sparkle appearance of the film facing outside of the window. Other films besides PET also can be used to achieve the same objective, such as polyethylene, polypropylene, polyurethane, acrylic and thin polycarbonate sheet.

The following Examples are provided to further detail the process of this invention.

EXAMPLE 1

A metallic pigment dispersed laminating adhesive is prepared in a drum by adding a polyester adhesive, aluminum pigment, methyl ethyl ketone, and toluene while mixing. The four components are in a weight ratio of 18.2:1:9.4:9.4. The percent of solid is about 21–22% with a viscosity range of 50–60 cp. The average particle size of the aluminum flakes is 21 microns. The flakes are coated with a silica coating and a layer of stabling agent. After the mixing, the adhesive passes an inline filtration process with double 100 micron filtration bags. The adhesive then is coated onto 1 mil clear PET film via a rod coater designed by Film Technologies, Inc. Other methods such as a slot die, reverse roll, or reverse gravure can be used to achieve the same result. The dry coat weight is controlled between 0.003 lb/ft$^2$ (14.6 g/m$^2$) to 0.0033 lb/ft$^2$ (16.3 g/m$^2$). The adhesive coated PET film has a 30–35% visible light transmission range. This will allow people to see the background color of the film composite. After the solvents are evaporated through an oven, the coated film is laminated to a 3-mil thickness black PET film. The black film can be made using either pigments or dyes. It is an opaque film. The second process is to coat a mounting adhesive over the clear PET film side. A typical adhesive is an acrylic based pressure sensitive adhesive. A UV absorber is recommended to blend with the adhesive to prolong the film's service life. Because of the surface characteristics of the aluminum flakes, there is no agglomeration in the laminating adhesive and therefore, the coating is uniform and smooth. The aluminum flakes show oriented texture while the solvents are evaporated.

EXAMPLE 2

All the processes are the same as EXAMPLE 1, but use a different type of aluminum flake. At this time, a non-silica coated aluminum flake is used. To increase the compatibility of the pigment and binder, a dispersion agent, and a hydrophobic layer of stearic acid is added by the manufacturer. The aluminum flake is categorized a leafing flake. Even with a pre-filtration process and inline filtration, there are many coating streaks and lines, which indicates a severe agglomeration. Changing coating methods such as a slot die or a reverse roll could not correct the problem. Increasing coating weight or decreasing the pigment and binder ratio can ameliorate the streaks but exacerbate the optical quality. The coating becomes less reflective or dull like a paint.

EXAMPLE 3

All the processes are the same as Example 1, but use non-leafing aluminum flake with an average particle size of 20 microns. There still are coating streaks due to the agglomeration. Pre-filtration and inline filtration do not eliminate the coating defect. The agglomeration seems to form during the coating process and inline filtration bags could not eliminate them. Changing smaller sizes of filters only blocks the flow and cause a higher pressure in the pipeline. These coating defects are the major concern of the product.

EXAMPLE 4

Fallout Testing: A sample consisted of six specimens of tempered glass with the spandrel glass film made according to Example 1 is tested against ASTM C 1048-92 Standard Specification for Heat-treated Flat Glass-Kind HS, Kind FT Coated and Uncoated glass. The test is conducted by ETC Laboratories, Inc., Rochester, N.Y. The results meet the standard.

The technical difficulty of producing a metallic flake dispersed spandrel glass film is the metallic flakes surface treatment and particle size distribution. It is a common knowledge that similar is soluble in similar. Metallic flakes are inorganic that will agglomerate even being uniformly dispersed in organic resin binder by mechanical force. The agglomeration will decrease the surface area of the metallic flakes and therefore, become a thermodynamic stable condition. Dispersion agents can be added in to modify metallic flake surface energy and improve the compatibility with resin binders. However, solvents can easily wash off the dispersion agents from the flakes and cause the agglomeration, especially after an intensive mixing. The agglomerated flakes are very difficult to re-disperse in the resin binder system. The only way is to filter them out with an inline filtration system. Since the agglomeration is a dynamic process and can be formed anywhere in the coating and circulation system, it is almost impossible to eliminate coating streaks which is a result of the agglomeration in the coating head. The case in EXAMPLE 1 used coated/encapsulated aluminum flake pigment, which will not be washed off by the solvents even after an extensive mixing. If mixed with resin binder in the right weight ratio, it can be coated on a film substrate defect free. EXAMPLE 2 and 3 used non-coated aluminum flakes. Even though the wetting agents, such as BYK P104, BYK P104D, BYK 410, BYK 411 and Anti Terra 204 were used to improve the stability of the pigment in the resin binder, the aluminum flakes were still agglomerated because of the thermodynamically unstable system. This caused the major coating defect.

The particle size and its distribution are also very important. A large particle size gives a brilliant sparkling effect and is easier to orient. However, with the current coating equipment and methods, it has a great chance to cause coating streaks. On the other hand, a smaller particle size has less chance to cause coating defects. But the visual effect is less desirable. The ideal average particle size is between about 23–27 microns. The particle size distribution should be as narrow as possible.

To achieve a uniform coating and "lock" the flakes into the adhesive matrix, a crosslinking agent should be used. One example would be isocyanide. It will react with hydroxy groups in the polymer chains and crosslink the polymer. Other crosslinkers also can achieve the same objective. Without crosslinking the polymers, the metallic flakes would migrate after an accelerated weathering testing, which cause undesirable dark spots.

The designed metallic flake spandrel glass films have been tested against ASTMG-154 method for accelerated weathering for 6,000 hrs. No discoloration, distortion, delamination, aluminum flake migration, or mounting adhesive failure is found. A slight yellowing is found in the mounting adhesive. It is a very stable composite film.

Figure 2:
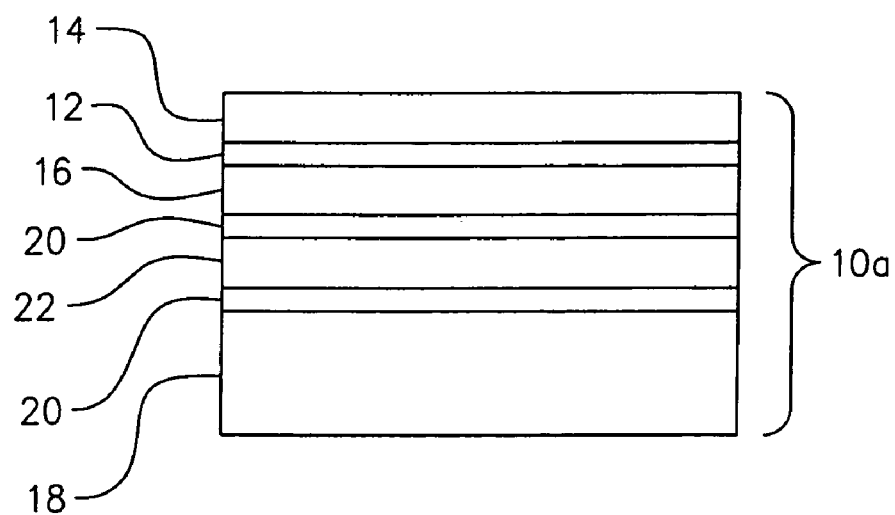
FIG. 2 is a cross sectional view of an alternate safety film manufactured from the process of this invention.

Referring to FIG. 1, a safety film 10 adapted for mounting on a glass plate is formed by adhesively bonding with a pressure sensitive adhesive 12 a silicone liner 14 to a clear PET film 16. Thereafter, a thicker PET film 18 is bonded to the clear PET film 16 with the encapsulated flake metallic laminating adhesive 20. As seen in FIG. 2, the metallic laminating adhesive 20 can be bonded to a second clear PET film 22 and then to the thicker PET film 18 to form an alternate safety film 10a.

Equivalent chemical components can be substituted for the chemical components described above to achieve substantially the same function in substantially the same way with substantially the same results.

A process for preparing a spandrel film composite, according to one example, comprises the process described in paragraph [0026], except that an additional layer of adhesive, without metallic flakes, is applied adhering an additional layer of film, to the second clear PET film.

Having disclosed the invention, what is claimed for Letters Patent follows:

1. A process for preparing a spandrel glass film composite containing metal flakes comprising:
   selecting a clear polymer film;
   preparing a laminating adhesive, wherein the step of preparing a laminating adhesive comprises:
      encapsulating metal flakes with a silica layer using a silane;
      admixing the encapsulated metal flakes in an adhesive using at least one solvent;
      adding a crosslinking agent; and
   laminating the laminating adhesive as a laminating layer on the clear polymer film.

2. The process of claim 1, wherein the step of preparing further comprises hydrolyzing the silane.

3. The process of claim 1, wherein the step of admixing includes selecting a polyester resin adhesive.

4. The process of claim 1, wherein the step of admixing includes selecting a solvent from at least one of methylethyl ketone or toluene.

5. The process of claim 4, wherein the step of admixing includes selecting the solvent in a weight ratio of methylethyl ketone to toluene from 10:90 to 90:10.

6. The process of claim 1, further comprising applying the clear polymer film to a second film such that the second film is adhered to the clear polymer film by the laminating layer.

7. The process of claim 6, wherein the step of applying includes making the second film opaque.

8. The process of claim 7, wherein the step of making includes coloring the second film.

9. The process of claim 8, wherein the step of coloring includes selecting a black film.

10. The process of claim 1, further comprising:
    applying the clear polymer film to a first additional film such that the first additional film is adhered to the clear polymer film by the laminating layer; and
    adhering a second additional film to the first additional film using an additional adhesive.

11. The process of claim 10, wherein the step of adhering the second additional film includes the step of preparing a laminating adhesive as the additional adhesive.

12. The process of claim 11, wherein the step of adhering includes making the second additional film opaque.

13. The process of claim 12, wherein the step of making includes coloring the second additional film black.

14. A process for preparing a spandrel glass film composite containing metal flakes, the steps comprising:
    (a) preparing a film laminating adhesive containing metallic flakes by admixing a resin adhesive and 10 to 30 micron average particle size metallic flakes with at least one compatible solvent and a crosslinking agent, the metallic flakes being encapsulated with a silane in a hydrolyzed condition and modified with a surfactant or dispersion agent;
    (b) coating the laminating adhesive of step (a) to a first clear film and laminating it to a second film to form the spandrel glass film composite;
    (c) coating a mounting adhesive to an outside surface of the first clear film; and
    (d) applying a silicone liner to the mounting adhesive for protection prior to mounting on a glass surface.

15. The process according to claim 14 wherein the crosslinking agent is isocyanide.

16. The process according to claim 14 wherein the first and second films are polyethyleneterephthalate films.

17. The process according to claim 14 wherein the resin adhesive is a polyester.

18. The process according to claim 14 wherein the average particle size of the metallic flakes is 14 to 28 microns.

19. The process according to claim 18 wherein the average particle size of the metallic flakes is 23 to 27 microns.

20. The process according to claim 14 wherein the weight ratio of metallic flakes to resin adhesive is from 1:2 to 1:50.

21. The process according to claim 20 wherein the weight ratio of metallic flakes to resin adhesive is from 1:10 to 1:20.

22. The process according to claim 20 wherein the weight ratio of metallic flakes to resin adhesive is 1:16 to 1:20.

23. The process according to claim 14 wherein the at least one compatible solvent is a two solvent mixture of methylethyl ketone and toluene.

24. The process according to claim 23 wherein the weight ratio of methylethyl ketone to toluene is from 10:90 to 90:10.

25. The process according to claim 24 wherein the weight ratio of methylethyl ketone to toluene is from 30:70 to 70:30.

26. The process according to claim 25 wherein the weight ratio of methylethyl ketone to toluene is 50:50.

* * * * *